(12) United States Patent
Faulstich et al.

(10) Patent No.: US 10,166,850 B2
(45) Date of Patent: Jan. 1, 2019

(54) DEFLECTION ELEMENT FOR A WIND DEFLECTOR OF A MOTOR VEHICLE

(71) Applicant: TB&C OUTSERT CENTER GMBH, Herborn (DE)

(72) Inventors: Rene Faulstich, Biebertal (DE); Hartmut Groos, Bischoffen (DE); Sebastian Post, Wetzlar (DE)

(73) Assignee: TB&C OUTSERT CENTER GMBH, Herborn (DE)

( * ) Notice: Subject to any disclaimer, the term of this patent is extended or adjusted under 35 U.S.C. 154(b) by 0 days.

(21) Appl. No.: 15/538,638

(22) PCT Filed: Oct. 15, 2015

(86) PCT No.: PCT/EP2015/073934
§ 371 (c)(1),
(2) Date: Jun. 21, 2017

(87) PCT Pub. No.: WO2016/078839
PCT Pub. Date: May 26, 2016

(65) Prior Publication Data
US 2017/0326957 A1 Nov. 16, 2017

(30) Foreign Application Priority Data
Nov. 18, 2014 (DE) .................. 10 2014 016 953

(51) Int. Cl.
*B60J 7/22* (2006.01)
(52) U.S. Cl.
CPC ...................... *B60J 7/22* (2013.01)
(58) Field of Classification Search
CPC ................... B60J 7/22; B60J 7/223
(Continued)

(56) References Cited

U.S. PATENT DOCUMENTS 1,877,065 A 9/1932 Selby
3,960,197 A * 6/1976 Daniels ............... A47G 1/0605
160/371

(Continued)

FOREIGN PATENT DOCUMENTS

DE 2005054186 A1 5/2007
DE 102009041291 A1 5/2011
(Continued)

OTHER PUBLICATIONS

ISA, European Patent Office, International Search Report PCT/EP2015/073934, dated Jan. 22, 2016, 3 pages.
(Continued)

*Primary Examiner* — Dennis H Pedder
(74) *Attorney, Agent, or Firm* — Christopher C. Dremann, P.C.; Christopher C. Dremann

(57) ABSTRACT

A deflection element for a wind deflector of a motor vehicle includes a flexible fabric configured to be transferred by a deployment element of the wind deflector into a raised or spread out use position in relation to a basic position. The deflection element has a fastening device along at least one upper or lower side edge of the fabric for fixing the deployment element on a base element of the wind deflector, or on a motor vehicle chassis. The fastening device has at least one first clamping strip and at least one second clamping strip connected to one another by connecting elements which correspond to one another and penetrate through the fabric to thereby clamp the side edge of the fabric between the first clamping strip and the second clamping strip.

13 Claims, 7 Drawing Sheets

(58) Field of Classification Search
USPC ...... 296/217, 85, 219; 160/383–404; 52/222
See application file for complete search history.

(56) References Cited

U.S. PATENT DOCUMENTS

| | | | | |
|---|---|---|---|---|
| 5,192,467 | A * | 3/1993 | Strunc | A61H 33/025 160/402 |
| 5,301,737 | A | 4/1994 | Martin | |
| 7,537,043 | B2 * | 5/2009 | Veivers | F16B 5/0028 160/371 |
| 7,753,101 | B2 * | 7/2010 | Johnson | E06B 9/52 160/368.1 |
| 8,550,565 | B2 * | 10/2013 | Caldwell | A47C 31/023 160/392 |
| 2008/0246306 | A1 | 10/2008 | Oerke et al. | |
| 2010/0231008 | A1 * | 9/2010 | Bergmiller | B60J 7/22 296/217 |

FOREIGN PATENT DOCUMENTS

| | | | |
|---|---|---|---|
| NL | 7811769 A | 6/1980 | |
| WO | WO-2007054083 A1 | 5/2007 | |
| WO | WO-2012052247 A1 | 4/2012 | |

OTHER PUBLICATIONS

International Bureau of WIPO, International Preliminary Report on Patentability, PCT/E2015/073934, dated May 22, 2017, 7 pages.
ISA, European Patent Office, Written Opinion of the International Searching Authority, PCT/EP2015/073934, dated Jan. 22, 2016, 6 pages.

* cited by examiner

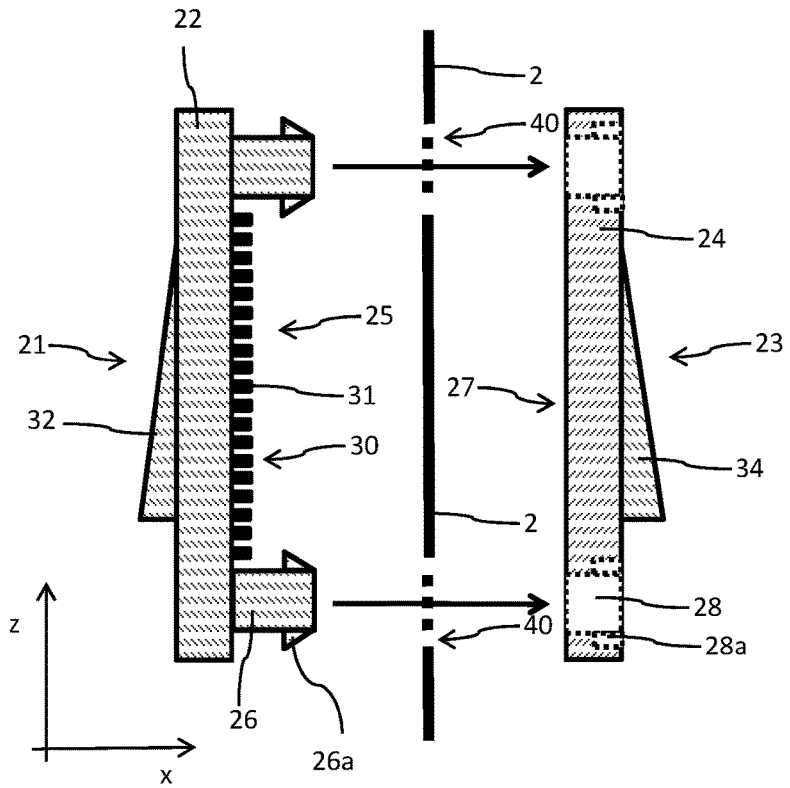
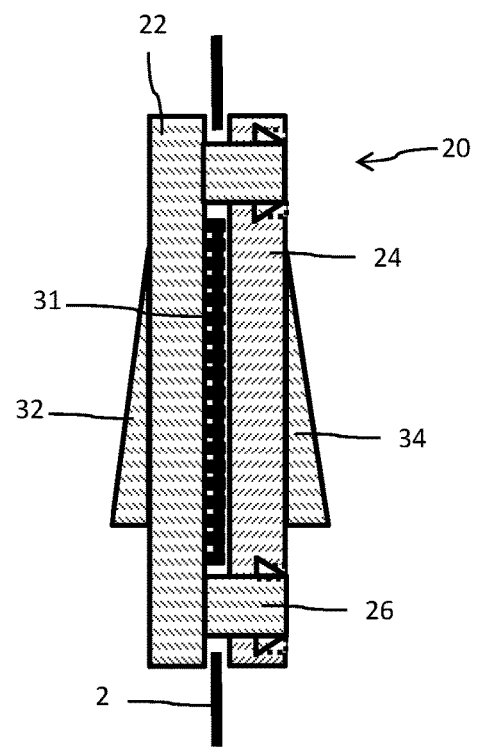
Fig. 2
A-A
Fig. 3

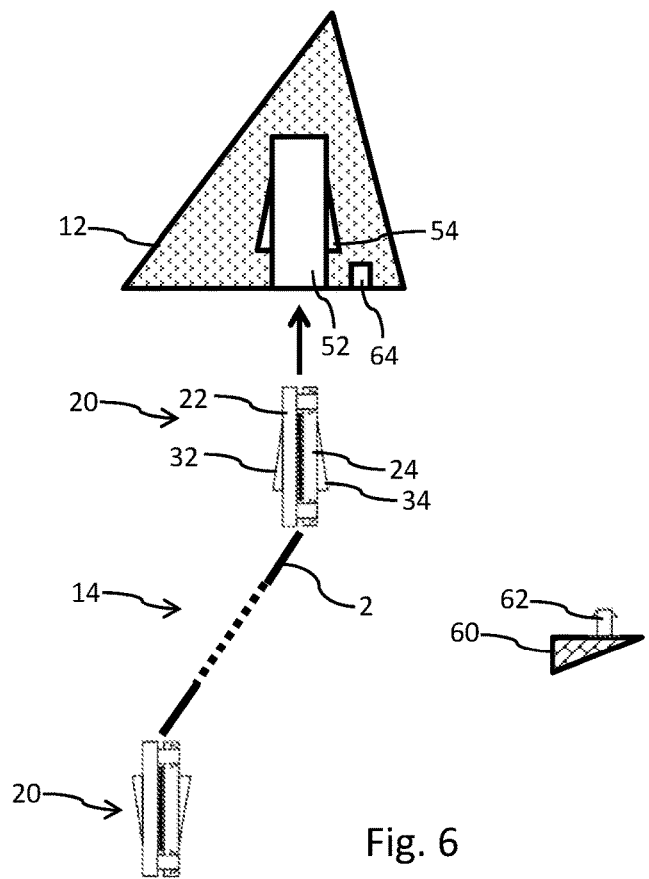
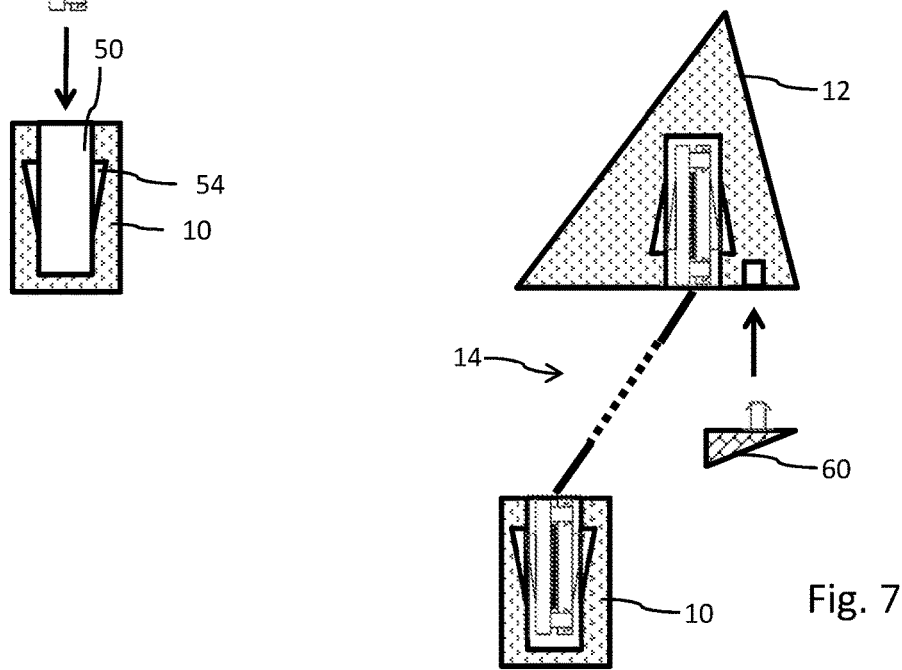
Fig. 6
Fig. 7

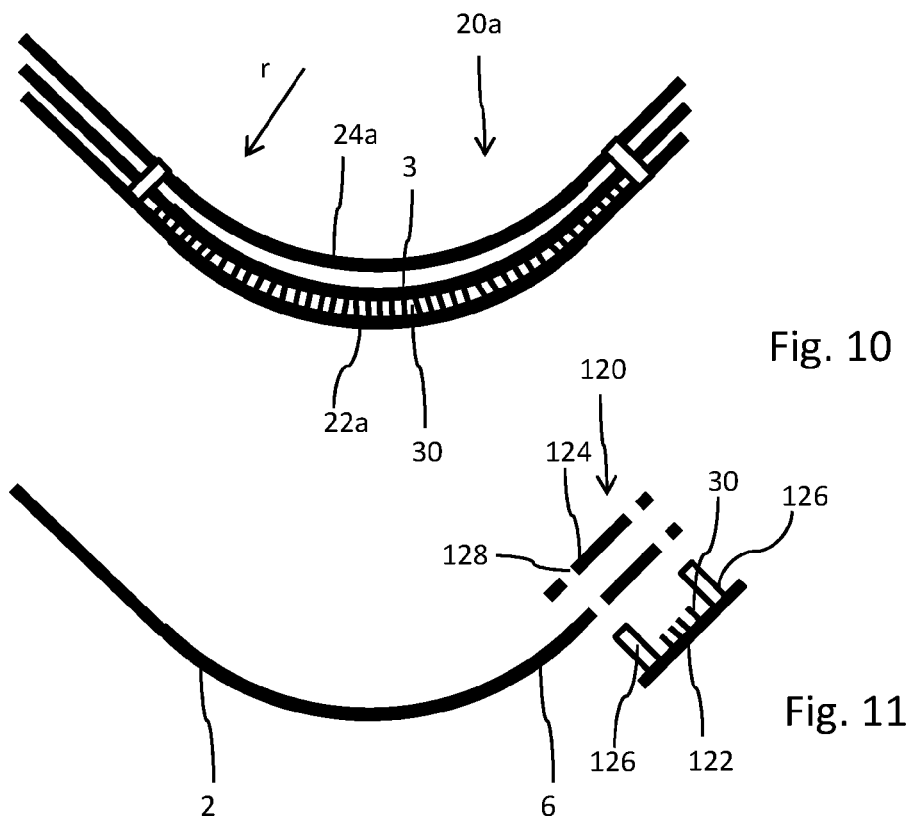
Fig. 10
Fig. 11
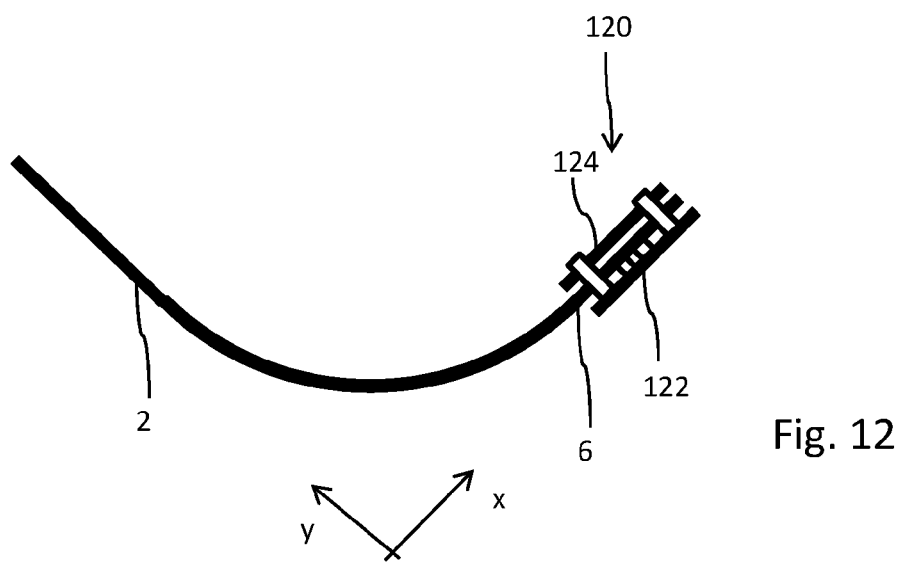
Fig. 12

DEFLECTION ELEMENT FOR A WIND DEFLECTOR OF A MOTOR VEHICLE

CROSS-REFERENCE TO RELATED APPLICATIONS

This is a United States national stage application of International Application No. PCT/EP2015/073934 filed on Oct. 15, 2015, which claims the benefit of priority of German Application No. DE 10 2014 016 953.7 filed on Nov. 18, 2014, the entire disclosures of which are incorporated herein by reference.

FIELD OF THE INVENTION

The present invention relates to a deflection element for a wind deflector of a motor vehicle. Furthermore, the invention relates to a wind deflector equipped with such a deflection element, to a corresponding motor vehicle and to a method for producing such deflection elements or wind deflectors.

BACKGROUND OF THE INVENTION AND RELATED ART

Wind deflectors have long been used in conjunction with sliding roof systems of motor vehicles. When a sliding roof is open, the wind deflector carries out the function of suppressing possible acoustic annoying noises which are caused in particular by periodic changes in air pressure and are perceptible in the vehicle interior in particular in the form of booming, or of preventing the arising of said annoying noises.

Conventional wind deflectors are customarily arranged in the region of that edge of a sliding roof opening on the motor vehicle roof which lies at the front in the direction of travel. When the sliding roof is open, a wind deflector deployment element mounted movably in relation to the body passes into a use position which is raised or spread out in relation to a basic position. A deflection element, typically in the form of a flexible fabric, in particular in the form of a net, and connected to the deployment element, which may be referred to as a deployment mechanism, is spread out by this means. As a motor vehicle is moving, the air-permeable fabric results in specific local air swirling, and therefore possible acoustic annoying noises are suppressed or the production thereof is substantially completely prevented.

In respect of construction and production, there are very varied wind deflector concepts. For example, DE 10 2009 041 291 A1 describes a wind deflector with a deflection element which can be spread out and the upper edge region of which is fastened via an edge strip to a pivotable deployment clip which comprises a clip body made of plastic. The edge strip of the deflection element is fixed here to the clip body by a welding process.

By contrast, a different wind deflector concept is described in WO 2012/052247 A1. Provision is made there to fasten the spread-out and flexible deflection element via an upper edge strip to a pivotable deployment clip. The upper edge strip and a lower edge strip are components here of an encircling plastics edge insert molding of the deflection element. The edge insert molding provided here furthermore comprises latching elements, by means of which a form-fitting, approximately latching connection of the deflection element to the deflector clip can be realized.

Furthermore, a wind deflector in the motor vehicle sector is known from DE 10 2005 054 186 B4. In order to connect a deflection element to a deployment mechanism, a connection device is described there with a two-part base region which is formed from two individual parts. A first individual part has a plurality of insertion pins and a second individual part has insertion openings formed in a complementary manner with respect thereto. The deflection element is clamped here between the two individual parts, wherein the insertion pins ensure the corresponding clamping effect. The insertion pins can also be designed as an insertion strip running continuously in the longitudinal direction.

However, the clamping of a deflection element typically configured as a flexible net between insertion pin and insertion openings inevitably leads to creasing in the region of the insertion pins. By contrast, an insertion strip running continuously in the longitudinal direction would prove disadvantageous in terms of assembly since the strip would probably have to be connected over its entire longitudinal direction to an insertion profile configured in a complementary manner with respect thereto. It could prove extremely difficult to clamp the flexible deflection element between the two individual parts without creases.

If in particular only individual insertion openings, which are spaced apart from one another approximately in the longitudinal direction of the individual parts, and insertion pins complementary with respect to said insertion openings are provided, then it may happen in practice that the deflection element is effectively held and fixed only in the region of the insertion pins and insertion openings which are in engagement with one another, but experiences only a comparatively small clamping action in regions between adjacent insertion pins and insertion openings, which may under some circumstances lead to undesirable creasing or rippling of the deflection element, in particular over the long term operation of the wind deflector.

In practice, flexible deflection elements are therefore typically insert molded on the edges.

The increasing diversification in motor vehicle manufacturing makes the configuration of differently dimensioned wind deflectors necessary, in particular even for small series. A manufacturing process based predominantly on injection molding for wind deflectors, for example just for the insert molding of the edges of the deflection element or net, has proven disadvantageous in terms of production, in particular with regard to the comparatively high acquisition and investment costs of injection molds.

To minimize costs, it is furthermore desirable to manufacture individual components of wind deflectors at different locations and to transport the finished or preassembled wind deflector to the production location of the motor vehicle concerned with as low transport costs as possible and with as low transport volume as possible.

OBJECT AND ADVANTAGES OF THE INVENTION

To this extent, the present invention is based on the object of providing an improved connection concept for fastening a deflection element to a wind deflector, said connection concept not only permitting cost-effective and efficient manufacturing, but also as universal an adaptation as possible to different required geometries and sizes of wind deflectors. The invention is intended furthermore to contribute to considerably reducing production and investment costs for production of the wind deflectors and also for the transport of wind deflectors or wind deflector components.

SUMMARY OF THE INVENTION

This object is achieved by a deflection element according to the present invention, a wind deflector according to the present invention, a motor vehicle according to the present invention and also by a method for producing a deflection element, consequently a wind deflector, according to the present invention, as set forth in the appended claims. Advantageous configurations are in each case the subject matter of the same or other appended claims.

In a first aspect, the invention relates to a deflection element for a wind deflector. The deflection element has a flexible fabric, typically in the form of an air-permeable net or knit, which deflection element is transferable by means of a deployment element of the wind deflector into a use position which is raised or spread out in relation to a basic position. For the connection, for example, to the deployment element, the deflection element has a fastening device along at least one upper side edge for fastening to the deployment element.

Alternatively or in addition, the deflection element can have a fastening device along a lower side edge of the fabric for fastening to a base element of the wind deflector or alternatively for fastening to the motor vehicle body, typically in the region of the roof cutout. The fastening device arranged on the fabric has at least one first clamping strip and at least one second clamping strip. The first and the second clamping strip are connectable to each other by means of mutually corresponding connecting elements passing through the fabric. Connecting elements of first and second clamping strip, which connecting elements are configured in a complementary or corresponding manner to one another, are connectable to one another clamping the fabric between the first and the second clamping strip.

By at least one of the connecting elements passing through the fabric, the fabric specifically does not experience any clamping action in particular in the region of the connecting elements. On the contrary, the fabric is clamped between the substantially flat and mutually facing inner sides of the clamping strips. The fabric therefore experiences an extremely homogeneous surface pressure between first and second clamping strip, and therefore it has much less tendency to creasing than is the case with known fastening devices.

The connecting elements of the clamping strips are typically integral parts of the clamping strips, and therefore, for the mutual connection of first and second clamping strips, separate handling of the connecting elements provided for this purpose is not required. It is provided in particular that only some of the connecting elements of first and second clamping strip, which connecting elements enter into engagement with one another, pass through the fabric. These connecting elements can be configured, for example, as projections or as pins on an inner side of the clamping strip concerned. A connecting element passing through the fabric can then enter into engagement on the opposite side of the fabric with a connecting element, which corresponds or is configured in a complementary manner to said connecting element, of the other clamping strip in each case and, by this means, can press the first and the second clamping strip tightly against each other.

According to one embodiment, the fabric has, along its side edge, an arrangement of through openings which correspond in respect of their shape and position with the shape and position of the connecting elements. By provision of a plurality of through openings along the side edge of the fabric, that is to say in a side edge region of the fabric, the latter has a type of connecting template, by means of which the fabric can already be pre-fixed to just one of the clamping strips.

By means of the through openings and the connecting template formed by them, the fabric can already be fixed to that clamping strip which has at least two connecting elements passing through the fabric. This is of particular advantage in terms of assembly. A corresponding clamping strip can be provided, for example, on an assembly platform or an assembly table. The fabric with its through openings provided therein can already be arranged by means of the through openings on the relevant connecting elements of the clamping strip before the second clamping strip can be placed onto the arrangement of first clamping strip and fabric and the fabric can finally be connected by clamping to the first clamping strip.

Furthermore, by means of a plurality of connecting elements and through openings corresponding thereto in the fabric, high assembly precision and assembly reliability can be provided. Firstly, an accurately fitting configuration of through openings and connecting elements makes it possible to provide a precise mutual arrangement of fabric and relevant clamping strip. Secondly, the specific geometrical shape of connecting elements and through openings and also the relative position of connecting elements and through openings with respect to one another in each case can permit a mutual fastening and arrangement of clamping strips and fabrics in just a single configuration or orientation. An erroneous, for example a rotated, arrangement of first and second clamping strip with respect to each other or in respect of the fabric can thereby be prevented.

In particular, however, by providing through openings in the fabric in the region of the connecting elements, the effect can be achieved that the formation of the connection of the two clamping strips to each other has scarcely any or no effects leading to a possible creasing or rippling on the fabric, and that clamping of the fabric between the clamping strips takes place exclusively outside the connecting elements, which are in engagement with each other, of first and second clamping strips. In particular, it is provided that a surface pressure or surface clamping of the relevant side edge between first and second clamping strip takes place in as homogeneous a manner as possible over the surface or over the side edge of the fabric.

According to another embodiment, a fixing structure entering into a clamping position with the fabric is provided on at least one inner side, which faces the fabric, of at least one of the first and second clamping strip. The fixing structure can in particular protrude at least slightly from the substantially flatly configured inner side of the first and/or second clamping strip.

By means of the fixing structure, stiction or sliding friction between the fabric and the relevant clamping strip can be raised to such an extent that slipping of the fabric relative to the fixing structure is effectively prevented. The fixing structure can be arranged on the inner side of the clamping strips at a distance from the connection elements. It can be located in particular in the intermediate space between connecting elements which are spaced apart from one another in the longitudinal and/or transverse direction of the clamping strip. It is conceivable in particular that an intermediate space in the longitudinal and/or transverse direction between adjacent connecting elements on the inner side of the clamping strip is provided with a fixing structure at least in sections or even substantially completely.

The specific embodiment of the fixing structure is adapted in particular to the mechanical properties of the fabric. According to another embodiment, the fixing structure can have a comb strip or toothed strip which extends along the side edge and has a regular arrangement of toothed elements or comb elements, and consequently individual, comparatively small, serrated or hook-like projections which lie against the fabric over a comparatively large area and thus extensively prevent slipping of the fabric in regions between adjacent connecting elements.

A particularly stable, durable and elegant, in particular crease-free connection of the fabric to the clamping strips can be realized by means of such fixing structures. For this purpose, a comparatively small number of connecting elements, which are in engagement with one another, on first and second clamping strip is already sufficient. The provision of as few connecting elements as possible is of particular advantage in terms of production and assembly.

According to another embodiment, it is provided that the connecting elements have pins and receptacles which mutually correspond in geometry and position on the mutually facing inner sides of first and second clamping strips. For example, a plurality of pins which are spaced apart from one another in the longitudinal direction or else in the transverse direction of the clamping strip can be arranged on the inner side of the first clamping strip and can be inserted in receptacles, which correspond with or are configured in a complementary manner to said pins, on the inner side of the second clamping strip. The pins and receptacles can have latching elements or latching structures which correspond with one another and permit an unreleasable fixing of the clamping strips with respect to one another and also on the flexible fabric. A nonreleasable connection here means a connection which is releasable exclusively by destruction of a connecting component.

In another embodiment of the deflection element, it is furthermore provided that at least two differently configured connecting elements are provided at least on an inner side of a clamping strip or on at least the inner sides of the clamping strips, said connecting elements being connectable to connecting elements corresponding therewith exclusively in one of a plurality of orientations of first and second clamping strips with respect to one another. This can be realized, for example, by differently configured pairs of connecting elements which are arranged at positions provided for them, typically eccentric positions, on the clamping strips. Should one of the two clamping strips be accidentally connected for example in a twisted configuration to the other clamping strip, the corresponding connecting elements do not fit onto one another and a connection of the two clamping strips is thereby prevented.

Furthermore or alternatively thereto, it is conceivable to select the positions of connecting elements which correspond with or are configured in a complementary manner to one another in such a manner that the first and the second clamping strip are connectable to each other exclusively in a predetermined orientation relative to each other. The same can also be provided for the arrangement of the flexible fabric on one or on both clamping strips. In particular by means of an asymmetrical or irregular arrangement of connecting elements and through openings, configured in a complementary manner thereto, on the fabric, the effect can be achieved that the clamping strip or the clamping strips are connectable to each other and also to the fabric exclusively in an alignment and orientation provided for this purpose. The risk of incorrect fittings can thereby be reduced. An outlay on instruction for the manufacturing staff can therefore be advantageously reduced.

According to another embodiment, it is furthermore provided that a fastening element is arranged on at least one outer side of at least one of the clamping strips, by means of which fastening element the deflection element is connectable to at least one of deployment element, base element or to a motor vehicle body. It is conceivable that the two clamping strips are each provided with fastening elements on their outer sides facing away from each other. For the connection to the deployment element, the base element or optionally to the motor vehicle body, mating fastening elements corresponding with the fastening element, or corresponding fastening structures are provided on the deployment element, on the base element or on the motor vehicle body.

The fastening element provided on at least one clamping strip is provided in particular for forming a form-fitting connection of clamping strip to one of deployment element, base element or motor vehicle body. The form-fitting connection of the clamping strip to one of deployment element or base element, which connection can be achieved by means of the at least one fastening element, permits separate premanufacturing of the deflection element independently of the deployment element or base element. Only over the course of a final assembly of the wind deflector or final assembly of the motor vehicle can the clamping strips and therefore the deflection element be connected to the deployment element, the base element or to the motor vehicle body. Transport and logistics costs can be significantly reduced in this manner if the fabric is actually packed and transported separately from the deployment elements and/or the base elements of the wind deflector.

According to another embodiment, the fastening element provided on the outer side of at least one of the clamping strips has a latching or clip element which is connectable in a form-fitting manner to at least one of deployment element, base element or to a motor vehicle body. It is also provided in this connection that the latching or clip element is connectable nonreleasably to the relevant deployment element, to the base element or to the motor vehicle body. A detaching of the latching or clip element from the deployment element, the base element or from the motor vehicle body is normally not provided.

Accordingly, the latching or clip element can be of robust and solid configuration and does not have to have any release means or release structures. It can therefore be realized in a particularly cost-effective manner merely by means of a thickening of material on the outer side of at least one of the clamping strips.

According to another embodiment the first and the second clamping strip each have at least a first and a second curved segment, which curved segments, with respect to their curvature, are connected to each other so as to lie against each other in the radial direction. The configuration of a clamping strip which is curved at least in regions permits a surface clamping or surface pressure of the fabric even in a region of curvature of the deployment element of the wind deflector.

By means of clamping strips which are curved in regions, the flexible fabric can be fastened to the deployment element or to the base or to the body of the motor vehicle without creases even in a portion of curvature of base element or deployment element. Wind deflectors typically have a central segment which extends in the transverse direction (y) of the vehicle and merges at its outer ends, for example via a 90° bend, into lateral cheek portions. By the first clamping strip having at least one first curved segment and by the second clamping strip having at least one second curved segment which comes to lie in an overlapping manner with respect to the first curved segment, the fabric can be fixed securely and without creases even in that curved portion. It is in particular conceivable here for the first and the second clamping strip to each have a first and a second curved segment on opposite end portions, and therefore the first and the second clamping strip are essentially adapted to the contour of the deployment element and/or of the base element.

In this respect, according to another embodiment, at least one of first and second clamping strip can be configured integrally and can extend over the entire upper and/or over the entire lower side edge of the fabric. It is furthermore conceivable that first and second clamping strip are each configured integrally, and that the first and second clamping strip accordingly extend along the entire upper and along the entire lower side edge of the fabric. First and second clamping strips can be configured in particular as injection molded components. They are preferably of comparatively flat and level design and follow the contour of the upper and the lower side edge of the fabric. The thickness of the arrangement of first and second clamping strip with fabric clamped in-between is typically less than 1 cm, less than 8 mm, less than 6 mm or less than 5 mm.

In particular, it is conceivable that the fastening device together with its first and second clamping strips acts as a type of edge-side weather strip for the fabric, which weather strip imparts a required mechanical rigidity to the fabric in the edge region and permits separate handling of the fabric, for example for transport and assembly purposes. The handling of the fabric which is flexible per se and in itself can be significantly simplified by means of the connection of first and second clamping strip in comparison to a configuration without a fastening device.

According to an alternative embodiment, at least one of first and second clamping strips is of multi-part configuration. A multi-part clamping strip has at least two curved cheek segments and at least one substantially rectilinear central segment located in between. It is conceivable in particular to configure one of the clamping strips integrally and to form the other clamping strip in multiple parts. The single-part clamping strip which extends over the entire upper or lower side edge of the fabric can act here as a type of assembly strip, onto which the flexible fabric can be first of all placed, and on which the individual segments of the multi-part clamping strip can then be arranged.

The first and/or second clamping strips can be manufactured in particular as injection molded components. In addition, it is conceivable for the two, first and second clamping strips, to each be of multi-part configuration, and for each of the first and second clamping strips to have two curved cheek portions and in each case a central segment located in between, wherein the cheek portions of the first and second clamping strips, which cheek portions come to lie against each other, and also the respective central segments of the first and second clamping strips are each connectable to one another in a form-fitting and/or force-fitting manner.

It is possible by means of segmentation of the clamping strip to form clamping strips of differing lengths and differing dimensions on the basis of a few standardized subsections. It is in particular conceivable to realize deflection elements of differing width or differing length in the transverse direction (y) of the vehicle on the basis of cheek segments which remain identical, but central segments of differing length or by means of a plurality of central segments. It is conceivable to provide standardized standard sizes for the edge-side cheek segments and also for central segments located in between. By replacement of a comparatively short central segment by a longer central segment, or by provision of a plurality of central segments strung together, the overall length or the extent of the deflection element in the transverse direction (y) of the vehicle can be adapted virtually as desired without separate injection molds having to be acquired or provided for this purpose.

According to another embodiment, the fabric is furthermore provided in sections with a reinforcing structure which has a first reinforcing strip and a second reinforcing strip. The reinforcing strips are connected to each other here by means of mutually corresponding connecting elements at least partially passing through the fabric. The reinforcing strips clamp a portion of the fabric between them. The mutual fastening of the reinforcing strips to the flexible fabric can be provided in a substantially identical or similar manner to the connection of the clamping strips to the fabric and can be accordingly configured.

The reinforcing structure can be provided in particular in the curved region or region of curvature of the fabric. The reinforcing structure can run, for example, parallel to a curved segment of the first and/or second clamping strip, but at a predetermined distance from the fabric. Furthermore, it is conceivable for a left or right-side edge of the flexible fabric, which side edge extends between upper and lower side edge of the fabric, to be provided at least in sections with such a reinforcing structure.

The reinforcing structure has less elasticity or flexibility than the fabric, but significantly higher flexibility or elasticity than the clamping strips. It is provided in particular that the reinforcing strips are manufactured from a different material than the clamping strips. While typically a thermoplastic, such as, for example, polypropylene (PP), polyamide (PA) or polybutylene terephthalate (PBT) or material mixtures formed therefrom, optionally with a fiber content of 0 to 50%, can be provided for the clamping strips, the reinforcing strips are typically manufactured from a thermoplastic elastomer (TPE). Suitable materials for the reinforcing strips are in particular also natural rubber, synthetic rubber, silicone or a similar mixture of materials. The reinforcing strips typically have a Shore hardness of between 50 and 80.

According to another embodiment, the reinforcing structure formed from first and second reinforcing strips is flexibly deformable and is deformable or foldable counter to a prestressing force from a folded-up basic position into an unfolded use position spreading out the fabric. By the reinforcing structure having an erecting or unfolding prestress, it can not only assist the movement of the deployment element, but on the contrary can also assist or predetermine an orderly and defined folding up and unfolding of the fabric during a deployment movement and retraction movement of the deployment element.

By the reinforcing structure and also the fastening device likewise being connected to the fabric by provision of reinforcing strips which are arranged on both sides of the fabric and enter directly into engagement with each other, a hitherto customary injection molding process is also superfluous for the provision of the reinforcing structure. Production and investment costs for the production can thereby be reduced further.

According to another embodiment, the reinforcing structure surrounds a left and/or right side edge of the fabric. In particular by means of the left and right surrounding of the side edge by means of the reinforcing structure, not only can fraying of the fabric be countered. What is more, a required folding behavior of the fabric can be induced by the connection of the side edge to the reinforcing structure.

According to another aspect, the invention furthermore relates to a wind deflector for arranging on a roof opening of a motor vehicle. The wind deflector has at least one deployment element and optionally a base element. In a final assembly position on the body of a motor vehicle, the deployment element can be arranged on a body of the motor vehicle, in particular on a roof structure of the motor vehicle, so as to be movable between a basic position and a use position raised and spread out in relation to the basic position.

In addition to the deployment element which is connectable movably to the motor vehicle body, the wind deflector has at least one previously described deflection element which can be arranged by means of its fastening device on at least one of the deployment element, the base element or on the motor vehicle body, or can be fastened thereto. If the wind deflector is provided with a base element, the deflection element can be arranged by means of its fastening device on the base element. If the wind deflector is configured without a base element, it is provided that the deflection element is fastened by means of its fastening device directly to the motor vehicle body. It is basically conceivable for only one of upper and lower side edge of the fabric to be provided with the fastening device according to the invention. However, the two, upper and lower side edges, are advantageously each provided with the fastening device which is described here and, for example, can be clipped on and configured in the manner of a weather strip.

According to another embodiment of the wind deflector, at least one of the deployment element and the base element has an insertion opening for receiving the fastening device of the deflection element. Provided in or on the receptacle of the deployment element and the base element are mating fastening elements or mating fastening structures which interact with the fastening elements of the fastening device of the deflection element, which fastening elements are provided on the outer side of at least one clamping strip.

It is conceivable in particular for the deflection element to merely be able to be introduced by means of its edge-side fastening device into an insertion opening provided for this purpose on the deployment element or on the base element and to be interconnectable in a latching or form-fitting manner by means of suitable fastening and mating fastening elements configured in a complementary manner with respect to one another. The formation of latching, clamping, spreading or wedge elements for the fastening element provided on the outer side of the clamping strip permits in particular a tool-free final assembly and fastening of the flexible fabric to the deployment element or to the base element, optionally also likewise to the motor vehicle body.

According to another embodiment, a reinforcing element closing the insertion opening at least in regions is arranged on at least one of the deployment element and the base element. The deployment element and the base element can each be designed, as viewed by themselves, as a plastics injection molded component. By provision of a reinforcing element, for example a metallic reinforcing element or a reinforcing element manufactured from plastic, the deployment element or the base element can be structurally reinforced. It is conceivable in particular also to connect the reinforcing element to the deployment element or to the base element without a tool. The reinforcing element can furthermore be configured as a metal and plastic composite component.

To this extent, fastening or connecting elements which correspond with one another or are configured in a complementary manner to one another can be seen on the reinforcing element and on the deployment element or the base element. It is furthermore conceivable for the reinforcing element to close the insertion opening on the deployment element or on the base element at least in regions, in which insertion opening the fastening device of the fabric is arranged. By means of the additional connection of the reinforcing element, for example to the deployment element, the mutual connection of fabric and deployment element can be reinforced and improved.

In another aspect, the invention finally relates to a motor vehicle which is configured with a previously described wind deflector.

Furthermore, a method according to the invention for producing a deflection element, and consequently a wind deflector, as previously described, is provided. The method here comprises the steps of providing a first and second clamping strip which have connecting elements corresponding with or complementary to one another. In a further step, a fabric which is preferably provided with through openings in a side edge region is trimmed. The fabric is then clamped between the first and the second clamping strip and by means of mutual connection of first and second clamping strips by means of the connecting elements provided thereon, wherein at least some of the connecting elements pass through the fabric.

Typically, the fabric is not only trimmed on the edge sides, but also, in the same pass, through openings are introduced into the fabric in the side edge region. The edge-side trimming and also the introduction of through openings can take place by means of one and the same machining tool, for example by means of a punch or by means of laser cutting. The through openings introduced into the fabric can likewise serve for the positioning on one of the two provided clamping strips, in particular on the connecting elements thereof. The further clamping strip can then be connected to the first clamping strip with the formation of as homogeneous as possible a surface pressure or surface clamping of the side edge region of the fabric.

The deflection element can be manufactured completely independently and separately from the deployment element or from the base element of the wind deflector. In particular, the fabric provided with the clamping strips and the fastening device formed by the latter can be transported in a collapsed and space-saving state to another location for the final assembly.

According to another embodiment of the method, it is furthermore provided that in order to produce differently dimensioned deflection elements, differently dimensioned clamping strips are provided or a plurality of clamping strip segments of differing size and/or design are selected from a choice of clamping strip segments. By providing a choice of differently configured clamping strip segments, differently fabricated and differently dimensioned fabrics can be enclosed in their edge region by means of suitable clamping strips, with a comparatively low outlay on tools and manufacture, and can be connected in a subsequent assembly step by means of the fastening device formed in each case by the clamping strips to otherwise provided deployment elements and/or base elements of wind deflectors, or directly to corresponding body portions of a motor vehicle.

Further method steps for producing the deflection element inevitably arise from the configuration and the interaction of the individual components of the deflection element and the wind deflector. To this extent, all of the features described with respect to the deflection element and with respect to the wind deflector and also actions and effects which can be obtained with said features also apply equally to the method for the production thereof; and vice versa.

BRIEF DESCRIPTION OF THE DRAWINGS

Further aims, features and advantageous configurations of the deflection element, the wind deflector and also the associated production method are explained in the description below of exemplary embodiments with reference to the drawings.

FIG. 2 shows a schematic and simplified cross-sectional illustration through an upper side edge of a deflection element in a preassembly configuration.

FIG. 3 shows the deflection element according to FIG. 2 with a fastening device which is fastened thereto and is formed by two clamping strips.

FIG. 6 shows a schematic cross section through an arrangement of the deflection element and the wind deflector during final assembly.

FIG. 7 shows a cross section according to FIG. 6 after connection of the deflection element to the deployment element and the base element.

FIG. 10 shows a further partial illustration of the deflection element according to FIG. 9 with interconnected clamping strips.

FIG. 11 shows a schematic illustration of the connection of a reinforcing structure to the left side edge of the fabric in a preassembly position.

FIG. 12 shows an illustration of the side edge according to FIG. 11, but in a final assembly position.

DETAILED DESCRIPTION OF EMBODIMENTS OF THE INVENTION

Figure 1:
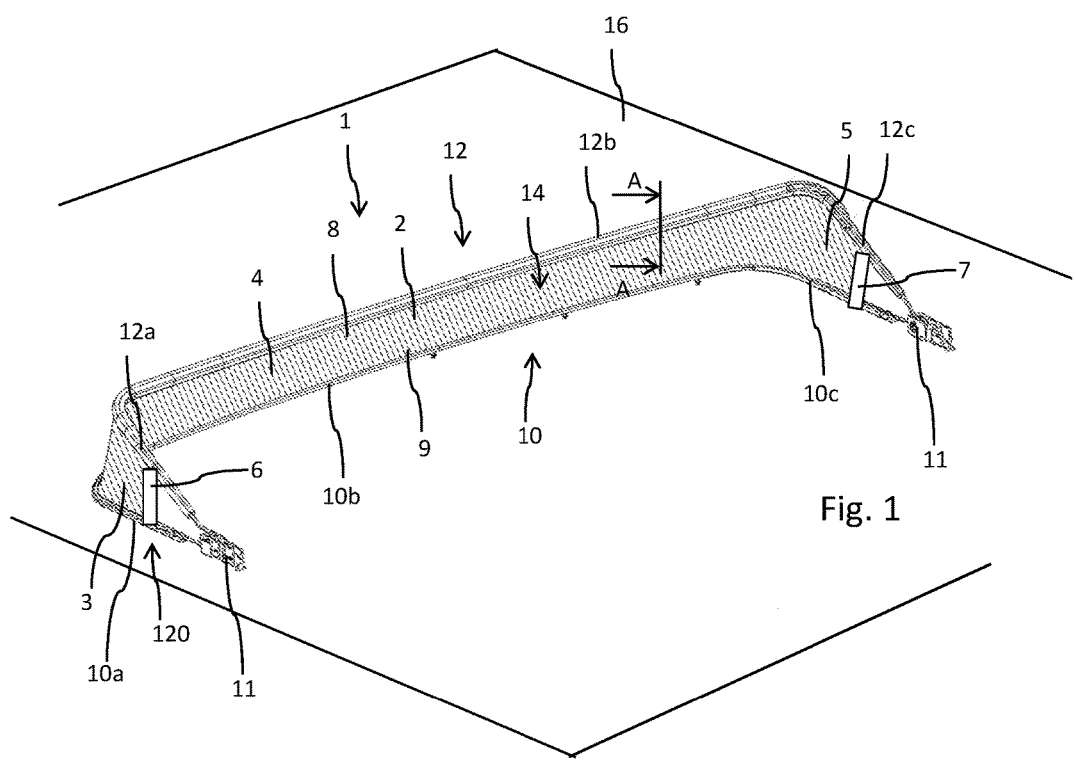
FIG. 1 shows a perspective illustration of a wind deflector according to the invention.

FIG. 1 shows, in a perspective illustration, a wind deflector 1 for arranging on a sliding roof opening of a motor vehicle body 16. In the present exemplary embodiment, the wind deflector 1 has a base element 10 coming to lie approximately in the plane of the roof structure of the motor vehicle body 16, and also a deployment element 12 mounted pivotably with respect to said base element. The base element 10 and the deployment element 12 have, as viewed from above, a U-shaped basic geometry, wherein the two outer limbs 10a, 10c of the base element 10 extend approximately in the longitudinal direction (x) of the vehicle. Similarly, the two outer limbs 12a, 12c of the deployment element 12, as viewed from above, are arranged approximately overlapping with the limbs 10a, 10c of the base element 10. The free ends of the limbs 10a, 12a and 10c, 12c are in each case connected pivotably to each other via a joint 11.

Between the opposite lateral limbs 10a, 10c, 12a, 12c, both the base element 10 and the deployment element 12 have a central segment 10b, 12b which is configured substantially rectilinearly and, in the final assembly configuration on the motor vehicle (not shown explicitly here), extends substantially in the transverse direction (y) of the motor vehicle.

The deployment element 12 is typically transferable counter to a resetting force, for example counter to a spring force, into a basic position in which it virtually completely lies against the base element 10. Located between the base element 10 and the deployment element 12 is a deflection element 14 which has a flexible, typically air-permeable fabric 2 with an edge-side fastening device 20. The fabric 2 is configured in particular as a flexible net, for example in the form of a woven fabric or a knit.

The fabric 2 is transferable by means of the typically spring-loaded deployment element 12 into the raised or spread-out use position which is shown in FIG. 1 and in which said fabric protrudes at least in regions from the silhouette of the motor vehicle roof and thereby brings about targeted air swirling in the region of the sliding roof when a motor vehicle is in movement. The fabric 2 has an upper side edge 8 which is connected to the deployment element 12. The fabric 2 furthermore has a lower side edge 9 which is connected to the base element 10. Lateral side edges, for example a left side edge 6 (illustrated on the left in FIG. 1) of the fabric 2 and a right side edge 7 of the fabric 2 come to lie spaced apart from the joint 11. The fabric 2 is configured integrally in its extent between the left and right side edges 6, 7. It has an approximately level central segment 4 which, in the transition to the limbs 12a, 12c, 10a, 10c from the deployment element 12 and base element 10, merges into a left cheek portion 3 and into an opposite right cheek portion 5. In particular in the region of said cheek portions 3, 5, it is fairly difficult in terms of manufacturing to bring about a crease-free connection of the flexible fabric 2 to the deployment element 12 or to the base element 10.

Although not shown in the figures, refinements of the wind deflector 1 which are configured without a base element 10 are also conceivable and within the scope of the invention. In such refinements, the function of the base element 10, that is to say a mounting of the lower side edge 9 of the fabric 2, is provided directly by the motor vehicle body 16. The lower side edge 9 of the flexible fabric 2 is connected here directly to the motor vehicle body 16 by means of a fastening device 20 extending along the lower side edge 9.

Figure 4:
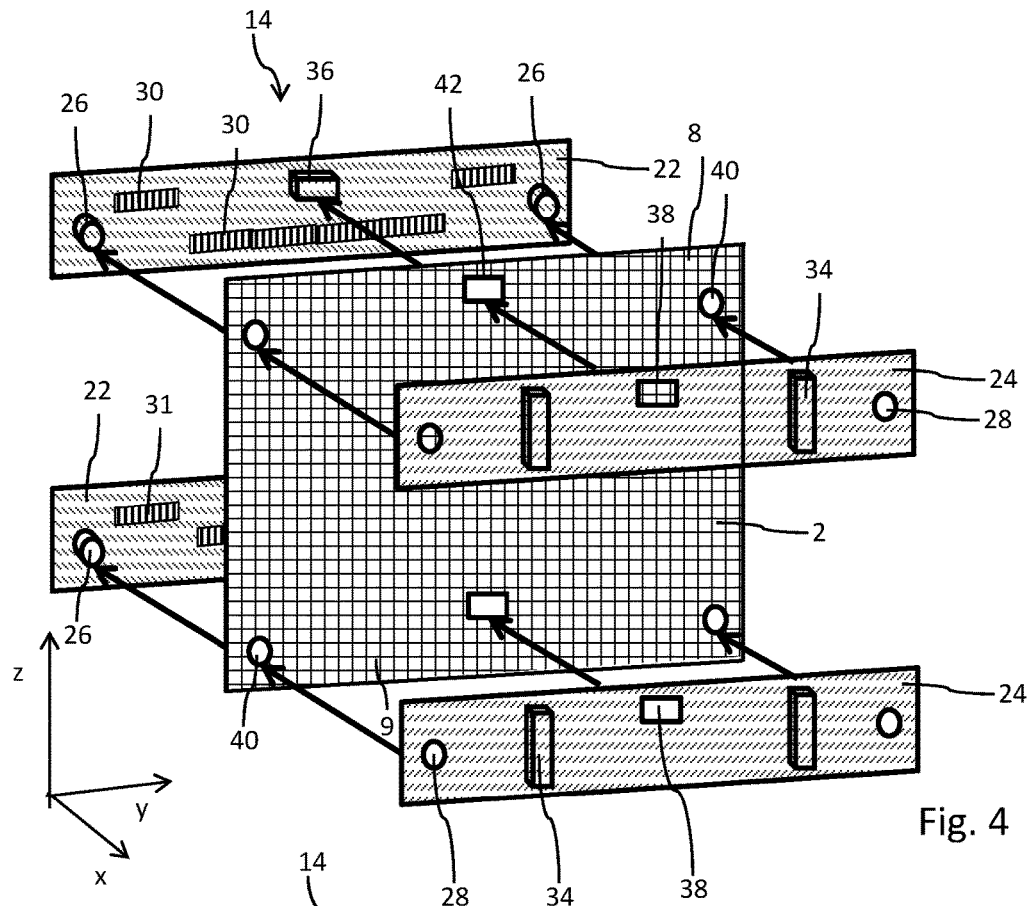
FIG. 4 shows a schematic and perspective illustration of a preassembly configuration according to FIG. 2.
Figure 5:
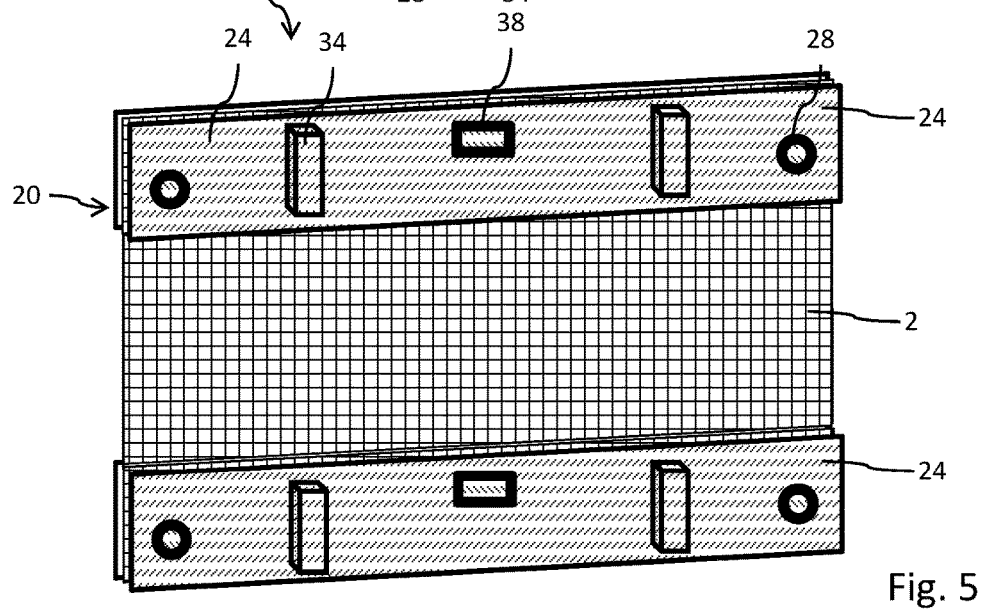
FIG. 5 shows a perspective illustration of the deflection element corresponding to FIG. 3.

For the fastening of the deflection element 14 and also for increasing its mechanical stability and for its structural reinforcement, the deflection element 14 is provided with a fastening device 20 on the edge sides, that is to say at least along an upper side edge 8 or along a lower side edge 9, as illustrated in FIGS. 4 and 5 and in detail in FIGS. 2 and 3. The fastening device 20 is formed here by a first clamping strip 22 and by a second clamping strip 24. The two clamping strips 22, 24 have connecting elements 26, 28 which correspond with each other or are configured in a complementary manner to each other. While only one connecting element 26 is shown in the vertical direction (z) of the vehicle in each of FIGS. 4 and 5, the somewhat larger illustration according to FIGS. 2 and 3 discloses a configuration with two connecting elements 26, 28 which are spaced apart from each other in the vertical direction (z) of the vehicle or vertically.

The first and the second clamping strip 22, 24 are connectable to each other by means of the connecting elements 26, 28, as is revealed from the joining position according to FIG. 3. The connecting elements 26, 28 are provided on the mutually facing inner sides 25, 27 of first and second clamping strip 22, 24. The connecting elements 26 of the first clamping strip 22 are configured here as latching projections, in particular as latching pins or in general as connecting pins which are introducible or insertable into connecting elements 28 of the second clamping strip 24, said connecting elements 28 being correspondingly configured as receptacles.

The connecting elements 26, 28 have mutually corresponding latching elements or latching structures 26a, 28a which enter into engagement with each other in a latching manner when a clamping or assembly position shown in FIG. 3 is reached. For example, the connecting elements 26 configured as pins have latching elements or latching structures 26a which expand outward and come to lie in latching elements or latching structures 28a, which correspond thereto and are configured for example as an undercut, of the connecting element 28 of complementary configuration, with the formation of a form-fitting connection of first and second clamping strips 22, 24.

In the assembly position shown in FIG. 3, at least one of the connecting elements 26 penetrates the flexible fabric 2. The fabric 2 advantageously has one or more through openings 40 which are matched to the position and geometry of the connecting elements 26. The fabric 2 thus does not undergo any deformation whatsoever in the region of the connecting elements 26, 28 which are in engagement with each other. Creasing can to this extent be effectively countered.

Furthermore, by provision of a plurality of through openings 40, 42, approximately forming a connecting template, in the edge region of the fabric 2, as illustrated for example in FIG. 4, particularly simple preassembly of the first clamping strip 22 with the fabric 2 can be provided. It can thus be provided in terms of assembly that the fabric 2 can be placed with its preconfigured through openings 40, 42 onto the first clamping strip 22 in such a manner that the protruding connecting elements 26, 36 pass through the through openings 40, 42, and therefore the fabric 2 comes to lie against the relevant clamping strip 22 as extensively and flatly as possible in the regions located between the connecting elements 26, 36.

By production of a connection of first and second clamping strip 22, 24 by means of the connecting elements 26, 28, 36, 38 configured in a complementary manner, an entirely homogeneous surface pressure can be achieved between the inner sides 25, 27 of first and second clamping strip 22, 24, and therefore an entirely homogeneous and durable clamping action can be exerted on the relevant side edge 8, 9 of the fabric 2.

In order to improve a clamping action, provision can furthermore be made to provide, on at least one of the inner sides 25, 27, a fixing structure 30 between or outside the connecting elements 26, 28, 36, 38. The fixing structure 30 can be configured in particular in the form of a comb strip or toothed strip 31 and can have individual teeth or hooks which are of comparatively small construction or of small configuration and by means of which an even better adhesion of the fabric 2 between the inner sides 25, 27 of first and second clamping strip 22, 24 can be brought about.

As shown schematically in FIG. 4, individual fixing structures 30 can be configured on the relevant clamping strip 22 at different distances in the transverse direction (z) and also in different lengths (y). It is furthermore conceivable for fixing structures 30 which enter into engagement with one another or are arranged offset with respect to one another to also be provided on the two mutually facing inner sides 25, 27, by means of which fixing structures a clamping action between the clamping strips 22, 24 can be improved once again. The fixing structures 30 can be connected integrally to the respective clamping strip 22, 24 or can be configured as an integral part of same. If the clamping strips 22, 24 are configured, for example, as a plastics injection molded component, the fixing structures 30 can be realized virtually neutrally in terms of costs.

As illustrated in FIG. 4, different pairs of connecting elements 26, 28 and 36, 38 can be provided on the first and second clamping strip 22, 24. In the present case, the pairs of connecting elements 26, 28 and 36, 38 differ by their geometrical design or geometrical shaping. The connecting elements 26 are designed as pins which are cylindrical or are of comparatively round configuration, while the connecting elements 36 have a substantially angular cross-sectional contour.

The connecting elements 28, 38 of the second clamping strip 24, which connecting elements are in each case configured in a complementary manner with respect to the connecting elements 26, 36, are also configured in a corresponding manner. The through openings 40, 42 in the edge region of the fabric 2 also have a contour corresponding to the connecting elements 26, 28 which are in each case configured in the manner of a pin. Such differently designed connecting elements 26, 36, 28, 38 make it possible to compel a mutual arrangement and fastening of fabric 2 and first and second clamping strip 22, 24 to be possible only in a single, namely in the predetermined, orientation.

The arrangement of different through openings 40, 42 in the edge region of the fabric virtually represents a connecting template which is connectable only in a correct orientation to a connecting template which is configured in a complementary manner with respect thereto and is formed by the connecting elements 26, 28, 36, 38. Instead of or in addition to connecting elements 26, 28, 36, 38 and through openings 40, 42 of geometrically different design, it can also be provided to configure the distances between adjacent connecting elements 26, 36 or 28, 38 in an irregular manner, and therefore a mutual arrangement in each case requires an unambiguous positioning of the clamping strips 22, 24 and of the fabric 2 with respect to each other.

According to the present exemplary embodiment, outwardly protruding fastening elements 32, 34 are in each case provided on the outer sides 21, 23, which face away from each other, of first and second clamping strip 22, 24, by means of which fastening elements the fastening device 20 formed by clamping strips 22, 24 is connectable to at least one of the deployment element 12 and the base element 10. For this purpose, a respective elongate insertion opening 52, 50 which, corresponding to the shape and contour of the fastening device 20, can substantially completely accommodate the fastening device 20 is provided on the deployment element 12 and on the base element 10.

In particular, mating fastening elements 54, for example in the form of undercuts, are provided on the inner sides of the insertion openings 50, 52, said mating fastening elements 54 interacting, for example in a form-fitting or frictional manner, with the fastening elements 32, 34 of the clamping strips 22, 24 when a final assembly position illustrated in FIG. 7 is reached. In the present case, the fastening elements 32, 34 are configured as a latching element which is provided with a run-on stop and latches in the manner of a fastening clip with the mating fastening element 54, that is to say with the undercut formed on the inner side of the insertion opening 50, 52, when the final assembly configuration shown in FIG. 7 is reached. It is basically sufficient if only one of the clamping strips 22, 24 has an outwardly protruding fastening element 32, 34. It is also conceivable for fastening elements 32, 34 configured on opposite outer sides 21, 23 of first and second clamping strip 22, 24 to be spaced apart from each other in the longitudinal direction of the clamping strips 22, 24.

For the final assembly of the deflection element 14, for example on the deployment element 12, the connection of a further reinforcing element 60, as shown in FIG. 7, can be provided. The reinforcing element 60 can be designed, for example, in the manner of a metal or plastic clip and can extend at least in regions along the deployment element 12. The reinforcing element 60 can also be connected to the deployment element 12 by means of a separate connecting element 62. The deployment element 12 which is typically manufactured as a plastics injection molded component has a connecting element 64 which is configured, for example, in the form of an insertion opening and receives the connecting element 62 of the reinforcing element, said connecting element being designed as an insertion pin.

Figure 8:
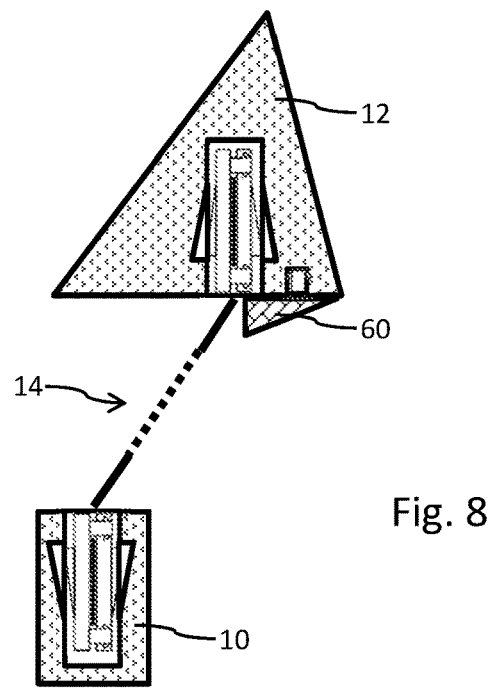
FIG. 8 shows an illustration corresponding to FIG. 7, but with a reinforcing element arranged on the deployment element.

In the final assembly configuration shown in FIG. 8, the reinforcing element 60 arranged on the deployment element 12 overlaps the insertion opening 52 at least in sections, and therefore the reinforcing element 60 not only contributes to a structural reinforcement of the deployment element 12, but likewise also contributes to a particularly secure and durable fixing of the relevant fastening device 20 of the deflection element 14 to the deployment element 12.

Figure 9:
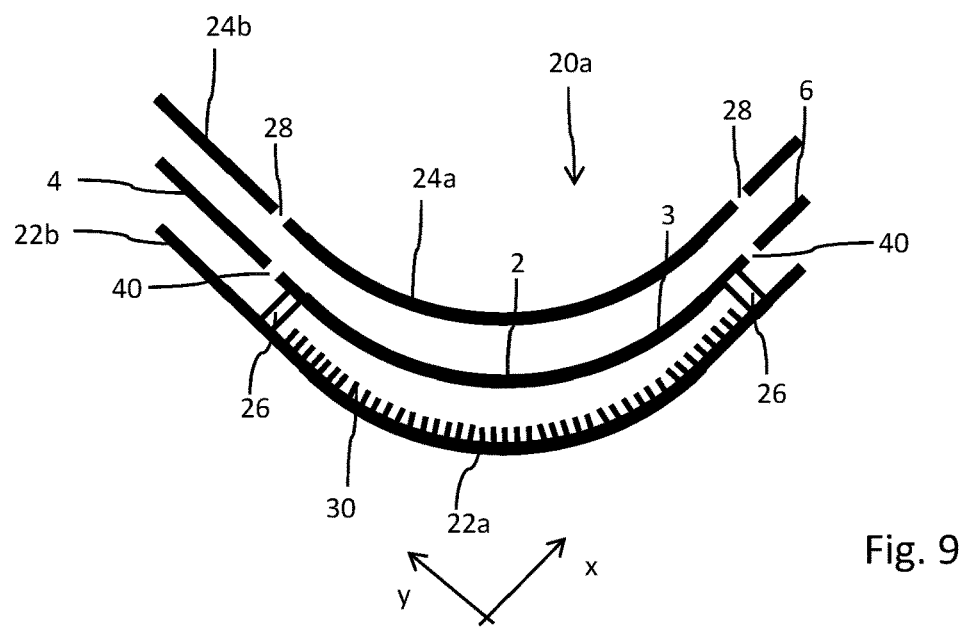
FIG. 9 shows a schematic view from above of a lateral curved portion of the deflection element in a preassembly configuration.

FIGS. 9 and 10 show a connection of the fastening device 20 in a region of curvature of the fabric 2, the connection corresponding to FIGS. 4 and 5. The clamping strips 22, 24 can extend along the entire transverse extent, that is to say along the entire upper or lower side edge 8, 9 of the fabric 2 and can in particular also provide a connection of the fabric 2 in the region of curvature of the fabric 2, for example in the transition between central segment 4 and the lateral cheek portions 3, 5. To this extent, the clamping strips 22, 24 can also have, at their opposite ends, curved cheek portions 22a, 22c, 24a, 24c which are connected to one another via a central portion 22b, 24b which is of substantially rectilinear configuration.

FIGS. 9 and 10 each show only the left outer curve or cheek portion 22a, 24a. In the configuration shown in FIGS. 9 and 10, the cheek portions 24a, 22a have mutually corresponding connecting elements 26, 28 which can be guided through through openings 40, which are provided for this purpose, in the cheek portion 3 of the fabric 2 and by means of which the cheek portions 22a, 24a are connectable to each other in a clamping manner. Also in the curved cheek portions 22a, 24a of the clamping strips 22, 24, at least one fixing structure 30 is provided on one of the inner sides of the clamping strips 22, 24. With respect to their radius of curvature as viewed from above in the illustration according to FIGS. 9 and 10, the cheek portions 24a, 22a lie against each other in a clamping manner in the radial direction (r), and therefore the fabric 2, in particular the cheek portion 3 thereof, is held substantially without creases and securely in the region of the curvature.

FIGS. 11 and 12 show the assembly of a reinforcing structure 120 on the left side edge 6 of the fabric 2 in a further plan view from above. The reinforcing structure 120 can be upwardly adjacent to an upper fastening device 20 and downwardly adjacent to a lower fastening device 20, and consequently to the deployment elements 12 and base elements 10 which are in engagement with the relevant fastening devices 20.

Similarly to the connection and mutual connection of the clamping strip 22, 24, the reinforcing structure 120 also has mutually corresponding reinforcing strips, namely a first reinforcing strip 122 and a second reinforcing strip 124 which, provided with connecting elements 126, 128 configured in a corresponding manner to each other, are connectable to each other and, in the process, clamp a portion of the fabric 2, namely the side edge 6, between them.

In addition to the structural reinforcement of the side edge 6, 7 of the fabric 2, the reinforcing structure 120 formed by the two reinforcing strips 122, 124 furthermore serves for a defined folding of the fabric 2 during the raising and lowering of the deployment element 12. It can be provided in particular that at least one of the reinforcing strips 122, 124 is provided with a prestress which, for example, then strives to transfer the reinforcing structure 120 into its spread-out use position shown in FIG. 1.

The fastening device 20 which can be arranged in particular along the entire upper side edge 8 and along the entire lower side edge 9 can either be configured as a single part, with the clamping strips 22, 24 provided for the formation of said fastening device having correspondingly curved cheek portions 22a, 22c, 24a, 24c on their opposite end portions. Alternatively, a multiple segmented configuration of clamping strips 22, 24 can also be provided, as is sketched in FIGS. 13 to 15 in a schematic illustration without the associated fabric 2.

Figure 13:
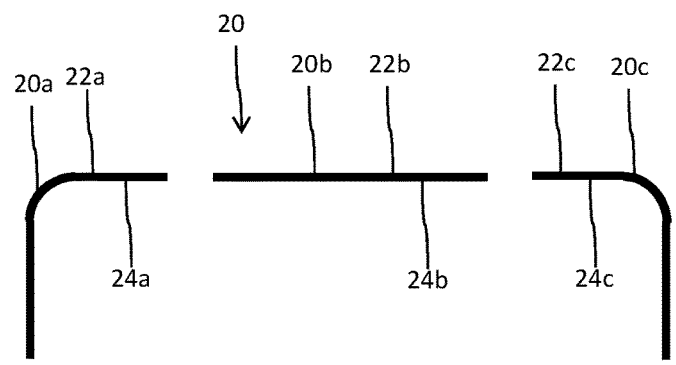
FIG. 13 shows a configuration of a comparatively narrow deflection element with a fastening device divided into three segments.

The fastening device 20 according to FIG. 13 has a total of three segments, namely a left cheek portion 20a, a central portion 20b and a right cheek portion 20c. Each of said cheek portions 20a, 20b, 20c is in each case formed by two correspondingly configured clamping strip segments comprising cheek portions 22a, 22c, 24a, 24c. The left cheek portion 20a is formed in each case by first and second left cheek portions 22a, 24a. The central portion 20b is formed by first and second central segments 22b, 24b, while the right cheek portion 20c is formed by first and second right cheek portions 22c, 24c.

Figure 14:
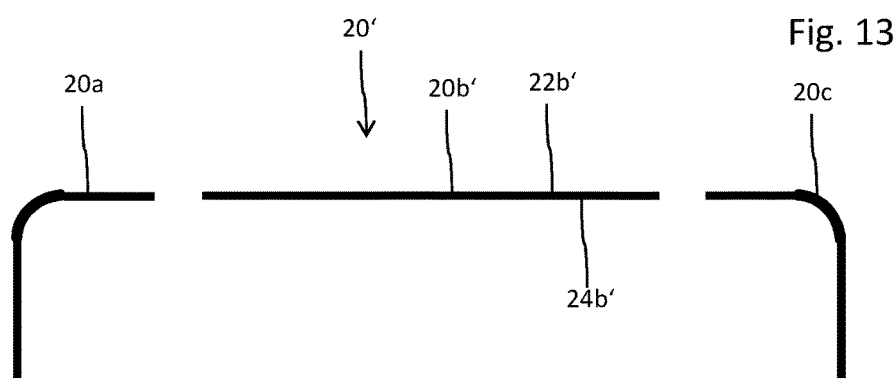
FIG. 14 shows a wider configuration of the deflection element in comparison to FIG. 13.

The fastening device 20, in particular a deflection element 14 configured therewith, is comparatively narrow in the transverse direction (y) of the vehicle. For the expansion and for the formation of a wider deflection element 14 for a wind deflector 1 of correspondingly wider configuration, a deflection element 14 which extends somewhat longer in the transverse direction of the motor vehicle should be provided with a correspondingly longer fastening device 20', as indicated in FIG. 14. The cheek portions 20a, 20c can be retained here unchanged in comparison to the configuration according to FIG. 13.

Figure 15:
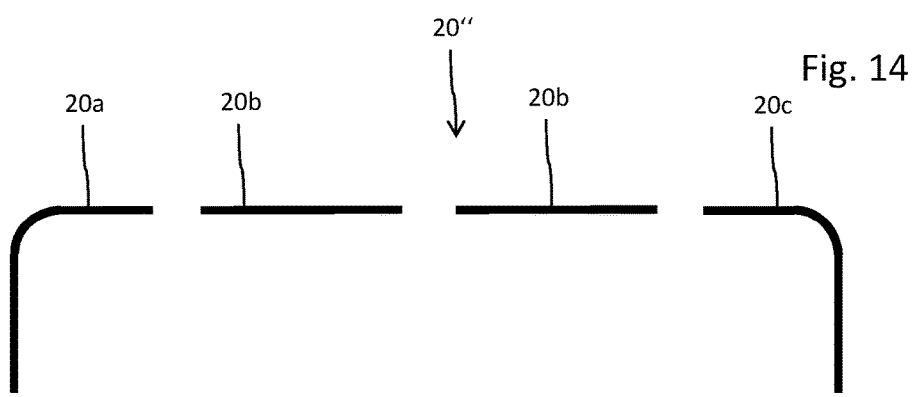
FIG. 15 shows an alternative configuration of the deflection element according to FIG. 14.
Figure 15:
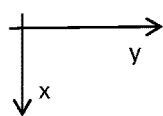

An extension of the fastening device 20, and consequently of the deflection element 14 and of the wind deflector 1, can be achieved solely by replacing the central portion 20b by a correspondingly longer central portion 20b'. The central portion 20b' of the fastening device 20', which central portion is configured to be somewhat longer to this extent and in comparison to FIG. 13, has central segments 22b', 24b' of first and second clamping strips 22, 24, said central segments being accordingly of longer configuration than the central segments 22b, 24b of FIG. 13. Alternatively, instead of the replacement of the central portion 20b by a longer central portion 20b', provision can also be made, according to FIG. 15, to combine two central portions 20b which are identical or differ in length in order overall to arrive at the required length of an alternative fastening device 20" as shown in FIG. 15.

For the formation of a corresponding deflection element 14, the different configurations of the fastening devices 20, 20', 20" of course also include correspondingly configured or trimmed fabrics 2. For a multiplicity of differently geometrically configured fabrics and deflection elements, different lengths and geometrical contours for fastening devices 20, 20', 20" can in each case be provided by a skillful combination of individual segments of clamping strips 22, 24.

For the formation of individual cheek portions and central portions, it is basically sufficient to provide a comparatively small number of standard components of different length or different geometrical configuration for clamping strips 22, 24, and therefore even small piece numbers of wind deflectors can be produced economically in terms of manufacturing and cost-effectively with comparatively low tool and investment costs.

That which is claimed is:

1. A deflection element for a wind deflector, comprising a flexible fabric which is transferable by means of a deployment element of the wind deflector into a use position relative to a basic position and which has a fastening device along at least one of an upper side edge of the fabric and a lower side edge of the fabric for fastening the deflection element to at least one of the deployment element, a base element of the wind deflector and a motor vehicle body, wherein the fastening device has at least one first clamping strip and at least one second clamping strip connected to one another by means of connecting elements which clamp the at least one of the upper side edge of the fabric and the lower side edge of the fabric between the first clamping strip and the second clamping strip, wherein a fastening element of the fastening device is arranged on an outer side of at least one of the first clamping strip and the second clamping strip, and wherein the fastening element is configured to be connectable to the at least one of the deployment element, the base element and the motor vehicle body by means of a latching element, and wherein the at least one of the upper side edge of the fabric and the lower side edge of the fabric has an arrangement of through openings which correspond in shape and position with the shape and position of the connecting elements.

2. The deflection element as claimed in claim 1, wherein a fixing structure is provided on an inner side of at least one of the first clamping strip and the second clamping strip.

3. The deflection element as claimed in claim 2, wherein the fixing structure comprises a comb strip or toothed strip extending along the at least one of the upper side edge of the fabric and the lower side edge of the fabric.

4. The deflection element as claimed in claim 2, wherein the connecting elements comprise pins and corresponding receptacles on the first clamping strip and the second clamping strip, respectively.

5. A deflection element for a wind deflector, comprising a flexible fabric which is transferable by means of a deployment element of the wind deflector into a use position relative to a basic position and which has a fastening device along at least one of an upper side edge of the fabric and a lower side edge of the fabric for fastening the deflection element to at least one of the deployment element, a base element of the wind deflector and a motor vehicle body, wherein the fastening device has at least one first clamping strip and at least one second clamping strip connected to one another by means of connecting elements which clamp the at least one of the upper side edge of the fabric and the lower side edge of the fabric between the first clamping strip and the second clamping strip, wherein a fastening element of the fastening device is arranged on an outer side of at least one of the first clamping strip and the second clamping strip, and wherein the fastening element is configured to be connectable to the at least one of the deployment element, the base element and the motor vehicle body by means of a latching element, and wherein the connecting elements comprise at least two differently configured first connecting elements which are connectable to corresponding second connecting elements in a predetermined alignment of the first clamping strip and the second clamping strip with respect to one another.

6. The deflection element as claimed in claim 1, wherein the first clamping strip comprises a first curved segment and the second clamping strip comprises a second curved segment which are connected to each other so as to lie against each other along their respective curvatures.

7. The deflection element as claimed in claim 1, wherein each of the first clamping strip and the second clamping strip is configured integrally and extends over the entire at least one of the upper side edge of the fabric and the lower side edge of the fabric.

8. The deflection element as claimed in claim 1, wherein each of the first clamping strip and the second clamping strip comprises at least two curved cheek segments and at least one substantially rectilinear central segment disposed between the at least two curved cheek segments.

9. A deflection element for a wind deflector, comprising a flexible fabric which is transferable by means of a deployment element of the wind deflector into a use position relative to a basic position and which has a fastening device along at least one of an upper side edge of the fabric and a lower side edge of the fabric for fastening the deflection element to at least one of the deployment element, a base element of the wind deflector and a motor vehicle body, wherein the fastening device has at least one first clamping strip and at least one second clamping strip connected to one another by means of connecting elements which clamp the at least one of the upper side edge of the fabric and the lower side edge of the fabric between the first clamping strip and the second clamping strip, wherein a fastening element of the fastening device is arranged on an outer side of at least one of the first clamping strip and the second clamping strip, and wherein the fastening element is configured to be connectable to the at least one of the deployment element, the base element and the motor vehicle body by means of a latching element, and wherein the fabric is provided with a reinforcing structure which has a first reinforcing strip and a second reinforcing strip connected to each other by connecting elements which clamp a portion of the fabric between the first reinforcing strip and the second reinforcing strip.

10. The deflection element as claimed in claim 9, wherein the reinforcing structure is deformable counter to a pre-stressing force from the basic position into the use position.

11. The deflection element as claimed in claim 9, wherein the reinforcing structure surrounds at least one of a left side edge of the fabric and a right side edge of the fabric.

12. A wind deflector for a roof opening of a motor vehicle, comprising a deployment element disposed on a body of the motor vehicle so as to be movable between a basic position and a use position and a deflection element having a fastening device which is fastened by means of a latching element to at least one of the deployment element and the body of the motor vehicle, wherein at least one of the deployment element and a base element has an insertion opening for receiving the fastening device of the deflection element, and further comprising a reinforcing element configured for closing the insertion opening on the at least one of the deployment element and the base element.

13. A method for producing a deflection element as claimed in claim 1, comprising:

providing a first clamping strip and a second clamping strip having connecting elements;

trimming a fabric;

clamping the fabric between the first clamping strip and the second clamping strip using the connecting elements to connect the first clamping strip and the second clamping strip together; and providing a plurality of differently dimensioned first clamping strips and corresponding differently dimensioned second clamping strips and producing a plurality of differently dimensioned deflection elements from the plurality of differently dimensioned first clamping strips and corresponding differently dimensioned second clamping strips.

* * * * *